United States Patent
Lehmann

[15] 3,691,510
[45] Sept. 12, 1972

[54] QUICK REPLACEMENT, SLACK TAKE-UP ELECTRIC CORD FOR LAMPS, RADIOS, CLOCKS AND THE LIKE

[72] Inventor: Herbert G. Lehmann, 5 Kent Road, Easton, Conn. 06612

[22] Filed: April 15, 1970

[21] Appl. No.: 28,762

[52] U.S. Cl..................................339/28, 339/97
[51] Int. Cl.......................H01r 11/00, H01r 11/20
[58] Field of Search................339/28, 29, 95–107, 339/223, 274; 174/65, 135

[56] References Cited

UNITED STATES PATENTS

| | | | |
|---|---|---|---|
| 2,602,831 | 7/1952 | Levitt | 339/97 |
| 2,680,145 | 6/1954 | Lanfear | 339/274 X |
| 2,799,009 | 7/1957 | Benander | 339/75 P |
| 2,810,894 | 10/1957 | Kerr | 339/99 |
| 3,008,571 | 11/1961 | Bond | 206/46 R |
| 3,083,344 | 3/1963 | Long | 339/97 X |
| 3,328,747 | 6/1967 | Dover et al. | 339/97 |
| 1,574,297 | 2/1926 | Lilleberg | 174/72 A |
| 2,714,711 | 8/1955 | Crane | 339/74 R |
| 3,179,916 | 4/1965 | Lawson | 339/174 |

Primary Examiner—Marvin A. Champion
Assistant Examiner—Terrell P. Lewis
Attorney—H. Gibner Lehmann

[57] ABSTRACT

A quick replacement, slack take-up electric cord for small appliances such as lamps, clocks, radios, etc. comprising a length of two-conductor lamp cord which is preferably coiled and permanently set in a helix, one end of the lamp cord having attached to it a conventional two-prong electric plug adapted to be inserted in a wall receptacle. The other end of the two-conductor cord carries, and extends into one end of a special elongate receptacle having a socket or recess at its other end, opposite the entrance of the two-conductor cord. Within the special receptacle are two metal connector pieces having sharp prongs, the latter being located at the inner end of the socket. The socket is of substantially oblong cross sectional configuration, whereby it is adapted to receive the freshly-cut end portion of the original, somewhat flat electric cord from the appliance, which cord has been cut close to the appliance. The receptacle also has a manually operable lever which is adapted to force the said cut end of the appliance cord laterally against the prongs, causing the latter to pierce the insulation of the appliance cord and make electrical connections thereto. Thus, replacement of a lamp or appliance cord involves merely cutting the cord an inch or so from the lamp base or appliance casing, inserting the cut cord end deeply in the receptacle of the replacement electric cord, and then operating the lever to cause the cut end to be impaled on the sharp prongs of the receptacle so that the prongs effect electrical connections to the conductors of the appliance cord. The plug of the replacement cord is then inserted in the wall receptacle, whereupon the installation is complete.

3 Claims, 4 Drawing Figures

PATENTED SEP 12 1972
3,691,510
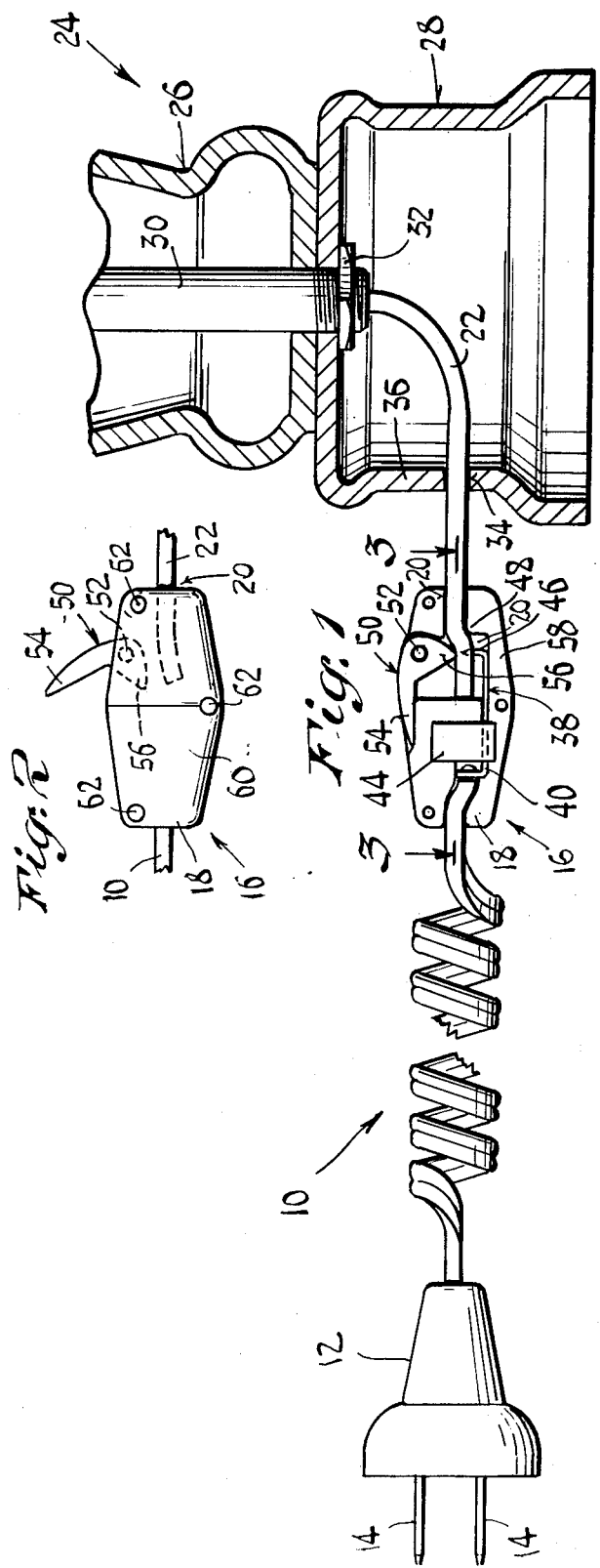
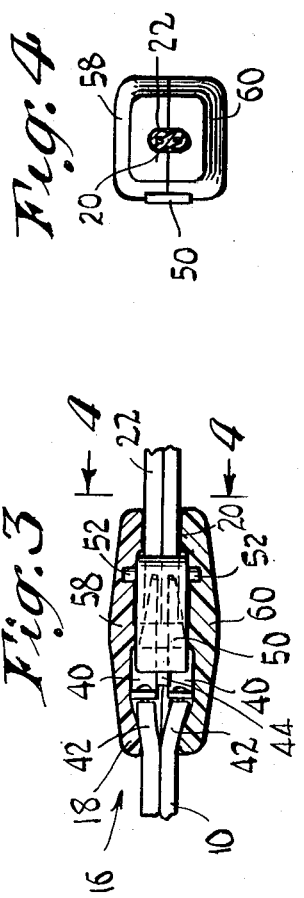
INVENTOR.
Herbert G. Lehmann
BY
H. Gibru Lehmann
AGENT

QUICK REPLACEMENT, SLACK TAKE-UP ELECTRIC CORD FOR LAMPS, RADIOS, CLOCKS AND THE LIKE

BACKGROUND

This invention relates to replacement electric cords for small electric appliances such as lamps, clocks, radios and the like. Heretofore the procedure in replacing an electric cord for a lamp, radio or clock required dismantling the device and removing the old electric cord therefrom. A new length of lamp cord or the like was then connected to the interior circuit of the device and threaded through the channels provided, and a two-prong plug was attached to the free end of the new cord. This procedure was not only time-consuming but it required a considerable amount of skill. For example, the radio or clock casing would have to be opened, or in the case of a lamp, the base and pedestal portion would have to be dismantled to enable the old cord to be pulled out and the new cord to be threaded in. Electrical connections, often involving soldering, would have to be made to the circuitry of the radio or clock, or to the sockets of the lamp. In most circumstances it was found that the original electric cord of the appliance at those locations within the casing or lamp pedestal, as the case may be, was perfectly sound and actually did not need replacement. Replacement was desired because of fraying of the external portions of the cord, or because the external portions became dirty, discolored or dried out and brittle. In most cases, the replacement procedure as set forth above had to be made by a competent electrician or radiotrician, or else a skilled handyman, and this was a distinct disadvantage in that it precluded quick replacement as well as easy replacement such as could be made by a housewife, for example.

SUMMARY

The above disadvantages and drawbacks of replacement of original or old electric cords in lamps, clocks, radios and the like are obviated by the present invention, which has for one object the provision of a novel and improved quick replacement electric cord which may be virtually instantly installed to replace the frayed, discolored or worn cord of a light-duty appliance. Another object of the invention is to provide an improved replacement electric cord as above set forth, which has an inherent slack take-up or helical formation whereby it is stretchable from a relatively short length to a much greater length, and whereby it normally automatically takes up slack, making it unnecessary to employ reeling or cord storage links or the like as heretofore utilized.

The foregoing objects are accomplished by a replacement electric cord comprising a length of two-conductor insulated wire having attached to one end a conventional two-prong electric plug. The other end of the length of wire carries a special receptacle fitting having a socket of substantially oblong cross-sectional configuration, and having a pair of contact prongs at the inner end of the socket, adapted to laterally pierce the inserted, freshly-cut end portion of a flat appliance cord as usually provided on lamps, clocks, radios and the like. Manually operable means such as a cam lever is provided, to force the cut end of the flat appliance cord against the prongs whereby the cord is impaled thereon, enabling the prongs to electrically connect with the conductors of the cut flat cord. The prongs are electrically connected with the two-conductor length of wire making up the quick replacement cord. Thus, the procedure for replacing the worn appliance cord involves merely cutting the worn cord at a point one or two inches from the appliance and inserting the freshly-cut remaining end in the socket of the receptacle fitting of the replacement cord. The cam lever is then operated to lock the cut end portion in place and cause it to be impaled on the connector prongs. This entire operation can be done in several seconds, and requires no skill whatsoever since the average housewife can carry out the procedure after reading appropriate simple directions telling her to cut off the old cord at a point 1 or 2 inches from the casing or lamp pedestal, and thereafter to insert the remaining cut cord portion in the socket, lastly actuating the lever to lock the appliance cord in place and thus simultaneously effect the electrical connections.

Still other objects and advantages of the invention reside in the provision of an improved replacement electric cord as above characterized, which is especially simple and inexpensive to produce, and wherein the receptacle fitting comprises relatively few parts which may be economically fabricated and assembled, thereby keeping the entire manufacturing cost of the replacement cord to a low figure; and the provision of a helically-coiled replacement electric cord arranged to be stretchable so as to take up slack without involving supplemental parts such as reels, take-up links and the like, wherein the helical configuration while inherent in the plastic insulation can take a "set" after the final installation, thereby relieving undesired tensions which could pull a light-duty appliance out of place.

Other features and advantages will hereinafter appear. In the accompanying drawings, illustrating one embodiment of the invention:

FIG. 1 is a view partly in side elevation and partly in axial section of a replacement electric cord installed on an electrical lamp, the latter being shown in partial section.

FIG. 2 is a side elevational view of the receptacle fitting portion of the replacement electric cord.

FIG. 3 is an axial sectional view taken on the line 3—3 of FIG. 1.

FIG. 4 is an end view of the receptacle fitting of the replacement cord, with the original appliance conductor shown in transverse section.

Referring now to the figures, the present improved replacement electric cord comprises a length of two-wire conductor 10 which in accordance with the invention is preferably although not necessarily coiled into a helical configuration and normally has only a slight tendency to return to its helical shape after considerable stretching. Such tendency may be inherent in the plastic insulation of the cord 10 if it is formed of extruded plastic material and given the helical configuration before the plastic has fully set. Or, ordinary lamp cord may be wound tightly around a ⅛ inch mandrel rod, the wire opening up to approximately a ½ inch coil after winding. By this latter procedure an improved product is had, since the coiled wire after being stretched will take a "set" in a new position and will not maintain appreciable constant tension which otherwise might dislodge a light-duty appliance, such as a clock or small lamp.

Secured to one end of the stretchable cord 10 is a conventional two-prong electric plug 12 having prongs or blades 14 which are electrically connected to the two conductors of the cord 10 in the usual manner.

Further, in accordance with the present invention, the other end of the cord 10 is provided with a novel elongate, hollow receptacle fitting 16 having an end portion 18 in which the cord 10 is received, the other end portion of the fitting 16 having a socket 20 of substantially oblong cross sectional shape, being adapted to receive the end of a "flat" lamp cord shown at 22. The lamp cord 22 is the original cord of the lamp designated generally by the numeral 24, said lamp having a pedestal portion 26 and a base portion 28, together with a conduit or pipe 30 passing through the pedestal and base portions and carrying a nut 32. The original lamp cord 22 passes through the conduit 30, and passes out through an opening 34 in a side wall 36 of the base 28.

As provided by the invention, the receptacle 16 has a pair of prong contacts 38, said prong contacts having base portions 40 to which the individual conductors 42 of the cord 10 are electrically connected. The prong contacts 40 are separated by an insulating slab 44, and prong contacts having sharp points 46 extending into the socket 20 of the receptacle at the bottom or inner end thereof. The outer end of the socket 20 is seen to be open at the exterior of the fitting 16, whereas the inner end of the socket is disposed in the interior of the fitting, that is, nearer to the fitting end 18 than other areas of the socket. Spaced from the sharp points 46 is a projecting wall 48 in the socket 20, and pivotally carried opposite the points 46 is a cam lever 50 which is movable about a pivot pin 52, said lever having a handle portion 54.

The lever 50 has a camming portion 56 which is removed from the socket 20 when the lever is in the raised position illustrated in FIG. 2. However, when the lever is swung counterclockwise from the position of FIG. 2 to the closed position of FIG. 1, the camming portion 56 of the lever will press against the inserted freshly-cut end portion of the original lamp cord 22, causing the latter to be forced against the points 46 of the prong contacts 38 whereby the lamp cord is impaled on the prongs. The two prongs 46 will pierce the insulation of the cord 22 and make electrical contact with the conductors thereof. Since the prong contacts are connected with the conductors 42 of the replacement cord 10, a complete electrical circuit will be established between the replacement cord 10 and the original lamp cord 22. It will be understood that as the lever 50 is swung to its closed position, the inserted end of the original lamp cord 22 would be somewhat bent around the projection 48 of the receptacle casing, and a secure locking action will be had inasmuch as the counterclockwise turning of the lever 50 is halted when it reaches the position of FIG. 1. Any pulls on the lamp cord 22 will merely serve to more securely impale the cord on the prongs 46 and lock it between the projection 48 and the tip of the camming portion 56 of the lever.

The receptacle fitting 16 may be advantageously constituted of two halves 58, 60 formed of molded plastic, said halves being secured together by small rivets 62.

It will now be understood from the foregoing that replacement of a worn electric cord of a lamp, radio, clock or the like involved merely cutting off the original cord at a point one or several inches from the casing or base of the appliance, and inserting the remaining freshly-cut end into the socket 20 with the lever 50 in the raised position, as illustrated in FIG. 2. Thereupon the lever 50 is swung closed to the position of FIG. 1 whereby the replacement is completed. The electrical connections between the original cord 22 and the replacement cord 10 will be made automatically as the insulation of the cord 22 is pierced by the points 46 of the prong contacts 38. The entire installation procedure may be effected in a matter of seconds, and may be done by an unskilled person such as a housewife. The coiled configuration of the replacement cord 10 provides a very neat appearance, and eliminates unsightly excessive lengths of cord from being disposed along the floor or other parts of the room.

Variations and modification are possible without departing from the spirit of the invention.

I claim:

1. A replacement electric cord for small appliances such as lamps, radios, clocks and the like, comprising in combination:
   a. a length of two-conductor electric cord comprising a plastic insulation of oblong cross section, and two conductors embedded therein and separated thereby, said cord comprising stiffening means constituted solely of said plastic insulation and conductors,
   b. a two-prong electric plug affixed to one end of said electric cord and having prong-type contacts electrically connected respectively to the conductors of the cord,
   c. an electric receptacle fitting attached to the other end of the electric cord, said receptacle fitting having an open-ended socket of substantially oblong cross-sectional configuration for receiving the cut end portion of a similar-section cord of the appliance, said socket having an outer end which is open at the exterior of the fitting and having an inner end disposed in the interior of the fitting,
   d. said receptacle fitting having a pair of sharp prongs disposed at the said inner end of the socket and electrically connected respectively to the conductors of said two-conductor cord, and
   e. manually operable means pivotally carried by the receptacle fitting and adapted to force laterally against the sharp prongs the end portion of a cut electric cord of an appliance when said cord is inserted in said socket, whereby the prongs pierce the insulation of the inserted appliance cord and make electrical contact to the conductors thereof,
   f. said length of two-conductor electric cord being coiled into a cold-set helix which extends between the electric plug and the receptacle fitting.

2. A replacement electric cord as defined in claim 1, wherein:
   a. the length of two-conductor electric cord comprises a "flat" extruded plastic lamp cord, b. the plastic insulation of said lamp cord having a cold-set helical configuration and being capable of taking other stretched "sets" as the helix is stretched, c. said plastic lamp cord being incapable of resuming its initial tightly coiled helical configuration once it has been stretched out.

3. As a new article of manufacture, a replacement electric cord for small appliances such as lamps, radios, clocks and the like, comprising in combination:

a. a length of all-one-piece two-conductor electric cord, b. a two-prong electric plug affixed to one end of said electric cord and having prong-type contacts continuously electrically connected respectively to the conductors of the cord, c. an electric receptacle fitting attached to the other end of the electric cord, said receptacle fitting having an open-ended socket of substantially oblong cross-sectional configuration for receiving the cut end portion of a similar-section all-one-piece cord of the appliance, said socket having an outer end which is open at the exterior of the fitting and having an inner end disposed in the in the interior of the fitting, d. said receptacle fitting having a pair of sharp prongs disposed at the said inner end of the socket, at least one of said prongs being continuously electrically connected to one of the conductors of said two-conductor cord, the other of said prongs being connectable to the other conductor of the cord, and e. exposed and accessible, manually operable lever and cam means carried by the receptacle fitting and adapted to force laterally against the sharp prongs the one-piece end portion of a cut electric cord of an appliance when said end portion is inserted in said socket, whereby both the prongs pierce the insulation of the inserted appliance cord end and make electrical contact respectively to the conductors thereof.

* * * * *